(12) United States Patent
Malka et al.

(10) Patent No.: US 10,402,259 B2
(45) Date of Patent: Sep. 3, 2019

(54) SYSTEMS AND METHODS FOR RESOURCE LEAKAGE RECOVERY IN PROCESSOR HARDWARE ENGINES

(71) Applicants: Uri Malka, Modiin (IL); Noam Efrati, Beer Sheva (IL); Eyal Elimelech, Ashdod (IL)

(72) Inventors: Uri Malka, Modiin (IL); Noam Efrati, Beer Sheva (IL); Eyal Elimelech, Ashdod (IL)

(73) Assignee: NXP USA, Inc., Austin, TX (US)

( * ) Notice: Subject to any disclaimer, the term of this patent is extended or adjusted under 35 U.S.C. 154(b) by 141 days.

(21) Appl. No.: 14/726,255

(22) Filed: May 29, 2015

(65) Prior Publication Data

US 2016/0350172 A1  Dec. 1, 2016

(51) Int. Cl.
*G06F 11/00* (2006.01)
*G06F 11/07* (2006.01)

(52) U.S. Cl.
CPC ...... *G06F 11/0793* (2013.01); *G06F 11/0724* (2013.01); *G06F 11/0751* (2013.01)

(58) Field of Classification Search
USPC ......................................................... 714/23
See application file for complete search history.

(56) References Cited

U.S. PATENT DOCUMENTS

| | | | |
|---|---|---|---|
| 5,953,530 A | 9/1999 | Rishi et al. | |
| 7,991,961 B1* | 8/2011 | Tsai ..................... | G06F 12/0253 711/132 |
| 2008/0294936 A1* | 11/2008 | Hogstrom ............. | G06F 11/366 714/6.13 |
| 2010/0325637 A1* | 12/2010 | Radmilac .............. | G06F 9/5083 718/104 |
| 2012/0173713 A1 | 7/2012 | Wang et al. | |
| 2014/0281751 A1* | 9/2014 | Gilda .................... | G06F 11/073 714/54 |
| 2015/0082085 A1* | 3/2015 | Chin ....................... | G06F 9/467 714/15 |
| 2015/0121126 A1* | 4/2015 | Bradshaw ........... | G06F 11/1471 714/6.3 |

* cited by examiner

*Primary Examiner* — Sarai E Butler

(57) ABSTRACT

The embodiments described herein provide systems and methods for recovering resources in processing devices. Specifically, the embodiments described herein provide techniques for recovering leaked resources allocated to hardware engines in a hardware processing core. As one example, the recovery of resources allocated to hardware engines can be facilitated by making a specified register available to monitoring software. When leaked or otherwise stuck resources are identified, the monitoring software can set the register to trigger the recovery of those resources. This recovery of resources can be then performed by stopping the execution of processes in the hardware engines, invalidating the resources previously allocated to the hardware engines, initializing the resources, and starting the handling of new processes in the hardware engines. This process effectively recovers those resources, and allows those hardware engines to quickly resume operations.

11 Claims, 2 Drawing Sheets

SYSTEMS AND METHODS FOR RESOURCE LEAKAGE RECOVERY IN PROCESSOR HARDWARE ENGINES

TECHNICAL FIELD

Embodiments described herein relate generally to processing units, and more specifically relate to resource management in processing units.

BACKGROUND

Processing devices, also sometimes referred to as processors, processing units, or microprocessors, are devices that utilize integrated circuits to perform a variety of functions. For example, some processing devices include integrated circuits designed to execute programs storied in a memory. Some processing devices include application-specific integrated circuits (ASICs) designed for particular use cases. Central processing units (CPUs) are types of processors that provide the central processing functionality of typical computers. Network processors are more specialized devices that are optimized to process network data packets. System on Chip (SoC) processors can integrate all a wide variety of components of a system into a single chip. Such devices may include digital, analog, mixed signal and other functions on a single chip substrate.

A typical modern processing unit will include multiple processor cores, and may include multiple hardware processing cores. In a typical implementation, each processor core can execute instructions independently. Multiple processing cores can thus run multiple instructions at the same, and thus can increase overall processing speed.

A typical hardware processing core will include multiple hardware engines. During operation, these hardware engines will utilize various resources in the processing core. For example, each hardware engine can be allocated memory in the hardware processing core, with that memory used in the processing performed by the hardware engines. One issue with such hardware engines is resource leakage. In general, resource leakage occurs when the hardware engine fails to release a resource after the action that used the resource is complete. When resources are not released after use, they cannot be reallocated and reused by other hardware engines. If this resource leakage continues the hardware processing core can run out of resources, causing the hardware processing core to become stuck and otherwise stop functioning.

The typical solution to resource leakage is to reset the entire system. For example, the entire computer or router may have to be reset to recover from the resource leakage. Unfortunately, performing such a full system reset can be complex procedure that takes significant time. With a network processor, the resetting of a router or other networking device can significantly degrade the performance of the larger network during the reset. Thus, what is needed are improved techniques for recovering from resource leakage in hardware processing cores.

DETAILED DESCRIPTION

Figure 1:
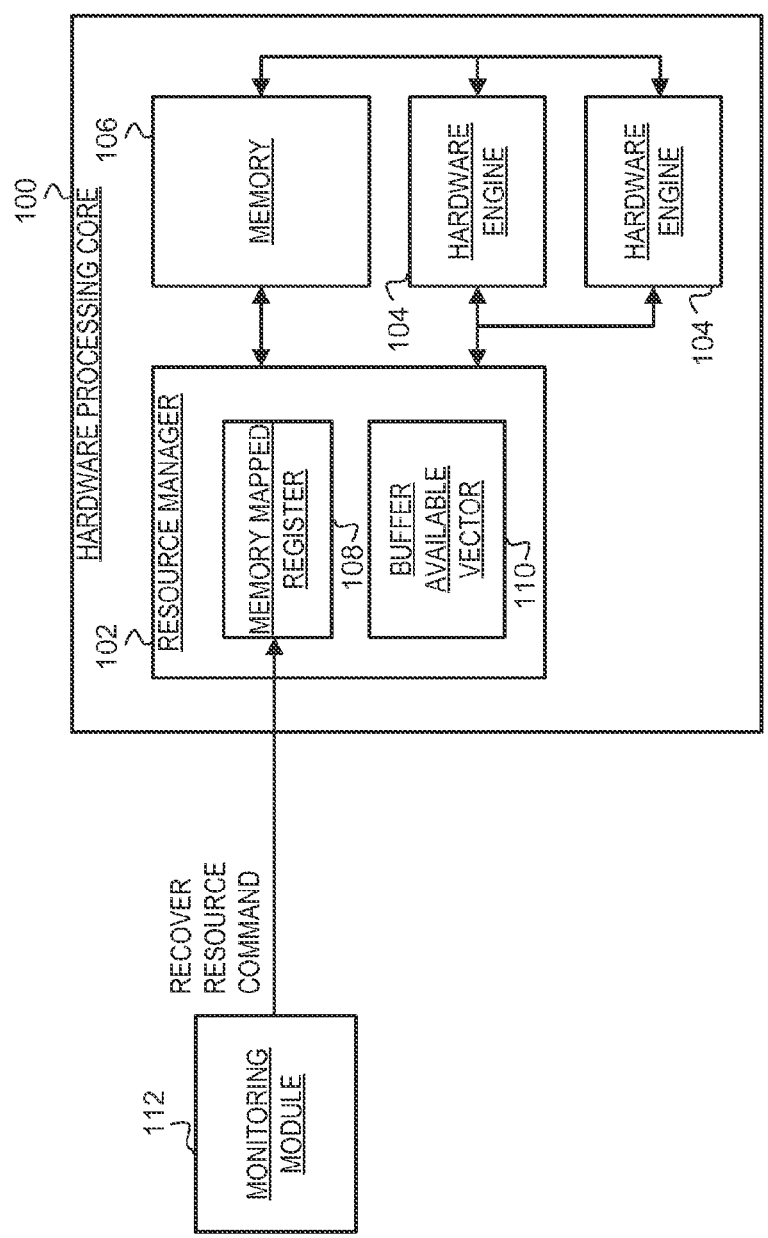
FIG. 1 is a hardware processing core in accordance with an exemplary embodiment.

The embodiments described herein provide systems and methods for recovering resources in processing devices. Specifically, the embodiments described herein provide techniques for recovering leaked resources allocated to hardware engines in a hardware processing core. These techniques allow the resources for specific hardware engines to be recovered without requiring a reboot of the entire surrounding system. The systems and methods can thus recover those resources more quickly and efficiently. When such resources are effectively recovered those hardware engines and associated devices can quickly resume operations.

As one example, the recovery of resources allocated to hardware engines can be facilitated by making a specified register available to monitoring software. When leaked or otherwise stuck resources are identified, the monitoring software can set the register to trigger the recovery of those resources. This recovery of resources can be then performed by stopping the execution of processes in the hardware engines, invalidating the resources previously allocated to the hardware engines, initializing the resources, and starting the handling of new processes in the hardware engines. This process effectively recovers those resources, and allows those hardware engines to quickly resume operations.

In general, hardware engines are specialized hardware processing elements that are implemented to perform specific tasks. Because they are implemented in hardware to perform specific tasks, they are typically much faster at performing those tasks than general purpose processors would be. Specifically, a typical hardware engine includes logic circuits that are hardwired to perform these specific tasks faster than could be implemented with general purpose processors running software to perform those tasks. Examples of the type of processing that can be performed with special purpose hardware engines are graphics acceleration and network communication. In each case, the hardware engine can be configured to provide specialized computationally intensive processing at higher speeds than a similar general purpose processor. For example, the hardware engines can be implemented to provide high levels of concurrency adapted for these specific tasks, resulting in higher speeds.

As one specific example, network processors are specialized processors designed to facilitate the transmission of packet data on a network. Network processors are used in a variety of network equipment, such as adapters, routers, switches and firewalls. As networks have grown in size and importance the demands on such network processors have increased. To meet these demands network processors can be implemented to use specialized hardware engines to perform a variety of functions needed for fast packet transmission. For example, network processors can use specialized hardware engines for packet and frame discrimination and forwarding.

One example implementation is to use specialized hardware engines in the input/output (I/O) layers of the network processor, for example, in a wire rate I/O processing layer (WRIOP). A typical wire rate I/O processing layer in a network processor is designed to process packets coming from a network interface and deliver those processed packets to the next layer of the processor. In a wire rate I/O processing layer, specialized hardware engines can be used to provide the high speed data packet processing needed to operate at wire speed, and thus can facilitate high speed network operation. For example, the hardware engines can be implemented with functional hardware designed to execute actions on the data packets to provide cryptography, TCP offload, etc. With specialized hardware engines used to provide these functions high speed and high reliability network operation can be provided.

In one specific example, the hardware engines can be implemented as part of a buffer manager interface (BMI). Buffer manager interfaces are commonly implemented in processing layers, and a typical processing layer may include multiple buffer manager interfaces for receiving data from internal memory. For example, when a data packet is received at the wire rate I/O processing layer, it can be processed by a frame manager module in several stages, with each stage including its own buffer manager interface. In such an implementation, one instance of the buffer manager interface can facilitate ingress packets (i.e., packets arriving from the wire and put in system memory to be further processed by other processing units) and another instance can facilitate egress packets (i.e., packets being read from system memory and sent to the transmit wire).

The embodiments described herein can provide the ability to recover resources in such hardware engines, including hardware engines implemented to provide high speed networking capability. Furthermore, these embodiments can provide the ability to recover these resources without requiring the reboot of the entire system, e.g., without requiring the reboot of the entire network processor or associated device. Instead, these embodiments can provide the ability to reallocate and restart processes only on specific hardware engines. When such resources are effectively recovered, those hardware engines can quickly resume operations, providing a quick recovery from the resource leakage.

Turning now to FIG. 1, an exemplary hardware processing core 100 is illustrated schematically. The hardware processing core 100 includes a resource manager 102, hardware engines 104, and memory 106. The resource manager 102 includes a memory mapped register 108 and a buffer available vector 110. In general, the resource manager 102 is configured to manage resources (e.g., memory) for the plurality of hardware engines 104. For example, the resource manager 102 can be configured to manage the allocation of memory chunks in the memory 106. To facilitate this, the resource manager 102 includes at least one buffer available vector 110, where the buffer available vector 110 is used to indicate which memory chunks in memory 106 are available to be allocated and which have been previously allocated. Thus, during operation of the hardware processing core 100, the buffer available vector 110 is used by the resource manager 102 to indicate which memory chunks in the memory 106 are available to be allocated, and which memory chunks have been previously allocated to one of the hardware engines 104 or to some other entity.

To facilitate the recovery of resources that may have been leaked or are otherwise improperly unavailable, the resource manager 102 includes the memory mapped register 108. The memory mapped register 108 is made available to monitoring entities that can determine if memory has leaked. In FIG. 1, the memory mapped register 108 is made available to a monitoring module 112. The monitoring module 112 can be implemented fully in hardware, or as software residing in memory and being executed by a processor, or in any combination thereof or other suitable manner. So implemented, one or more bits on the memory mapped register 108 can be set by the monitor module 112 calling a recover resource command. Then, in response to an appropriate bit in the memory mapped register 108 being set by the monitoring module 112, the resource manager 102 will recover the leaked resources in the memory 106.

Specifically, in accordance with the embodiments described herein, in response to a bit in the memory mapped register 108 being set, the resource manager 102 is configured to: stop processes in the plurality of hardware engines 104; invalidate resources previously allocated to the hardware engines 104; initialize resources to the hardware engines 104; and start the handling of new processes in the hardware engines. This procedure frees the leaked resources allocated to the hardware engines 104 in the memory 106, and as such can prevent the overall hardware processing core 100 from becoming stuck due to a lack of available resources.

To implement this procedure, the resource manager 102 can be configured to stop processes in the plurality of hardware engines 104 in response to the setting of memory mapped register 108. For example, the resource manager 102 can be configured to issue appropriate commends to the plurality of hardware engines 104 in response to the setting of memory mapped register 108. Such commands could be issued directly from the resource manager 102, or through some other intermediary.

The resource manager 102 is also configured to invalidate the previously allocated resources in response to the setting of memory mapped register 108. This can be implemented by configuring the resource manager 102 to send appropriate commands to the hardware engines 104 to instruct them to invalidate the resources previously allocated by resource manager 102.

The resource manager 102 is also configured to initialize resources in response to the setting of memory mapped register 108. This can be implemented by configuring the resource manager 102 to clear the buffer available vector 110, effectively putting associated memory chunks back to the available state. This clearing of the buffer available vector 110 can be performed by sending of the appropriate command to reset the buffer 110.

Finally, the resource manager 102 can be configured to start the handling of new processes in the hardware engines. This can be implemented by configuring the resource manager 102 to issue appropriate commends to the plurality of hardware engines. Such commands could be issued directly from resource manager 102, or through some other intermediary.

It should be noted that the hardware processing core 100 illustrated in FIG. 1 is a very simplified example, and in a typical implementation the hardware processing core 100 would include many other elements and devices. As just one example, a typical hardware processing core 100 could include multiple resource managers 102, and multiple memories 106 being managed by those resource managers 102. Additionally, a typical hardware processing core 100 could include many more hardware engines 104, each implementing one or more specialized tasks. And again, these additionally hardware engines 104 can have memory allocated by corresponding resource managers 102, with each resource manager 102 configured as described above to recover resources when an appropriate command is received by the resource manager 102.

Specifically, in such an embodiment, the plurality of hardware processing cores 100 could each include a memory 106 a plurality of hardware engines 104, and a plurality of resource managers 102. Each of the plurality of resource managers 102 could then include a 108 accessible a monitoring module 112. In this case, in response to a received command to recover the leaked resource, each resource manager 102 would be configured to: stop processes in the plurality of hardware engines 104 that correspond to that resource manager 102; invalidate resources previously allocated to the corresponding plurality of hardware engines 104; initialize the resources; and start handling of new processes in the corresponding plurality of hardware engines 104. It should be noted in that this case the monitoring module 112 could be configured to identify an occurrence of a leaked resource in a hardware processing core 100 by monitoring for a stuck frame in each of the plurality of hardware processing cores 100. When such a leaked resource is detected, the monitoring module 112 can be configured to issue the command to recover the leaked resource to the corresponding one of the plurality of resource managers 102 that manages the resources that were leaked.

Additionally, the hardware processing core 100 would commonly be implemented with other processing cores and other elements as part of a much larger processing device. For example, the hardware processing core 100 could be integrated into the wire rate I/O processing layer of a network processing layer. In a wire rate I/O processing layer the hardware engines 104 can be used to provide specialized high speed data packet processing as described above. Other additional layers could also be implemented with the hardware processing core 100. For example, a typical implementation could include both an application I/O processing layer configured to provide security, load balancing and pattern matching. A typically implementation could also include a general purpose processing layer with one or more central processing units (CPU). And finally, it should be noted that in such implementations, the embodiments described herein facilitate the recovery of resources leaked by the hardware engines 104 through the actions of the associated resource manager 102, while other elements in these devices can continue to function.

As described above, the monitoring module 112 can be configured to monitor the hardware processing core 100 for leaked resources. Such a monitoring module 112 can be implemented in a variety of ways. For example, the monitoring module 112 can be configured to monitor a port for a stuck frame in the hardware processing core 100. Specifically, the monitoring module 112 can be implemented to monitor a frame counter while a corresponding port is indicated to be active. In this case, the port would indicate activity for any of the hardware engines 104 that use the memory 106. Thus, the port being busy corresponds to a occupied resource, and a frame counter that does not change while the port is busy is an indication that the resources are no longer being actively updated, and that the resources has likely been leaked.

In one specific example, the monitoring module 112 can be implemented to monitor for port busy indications with port frame counters that do not change for specified amounts of time. For example, the monitoring module 112 can be implemented to monitor for busy periods without frame counter change that last more than 100 microseconds. Thus, if the port is busy for the specified 100 microseconds while the frame count does not change, it can be determined that the resources have leaked and that processing has stuck.

It should be noted that the monitoring module 112 can be implemented in various locations, layers and entities. For example, the monitoring module 112 can be implemented to run on a CPU in the general purpose processing layer of the associated device. With the monitoring module 112 running on a CPU, the monitoring module can call the recover resources command on the appropriate memory mapped register 108 when a resource leak is detected.

Figure 2:
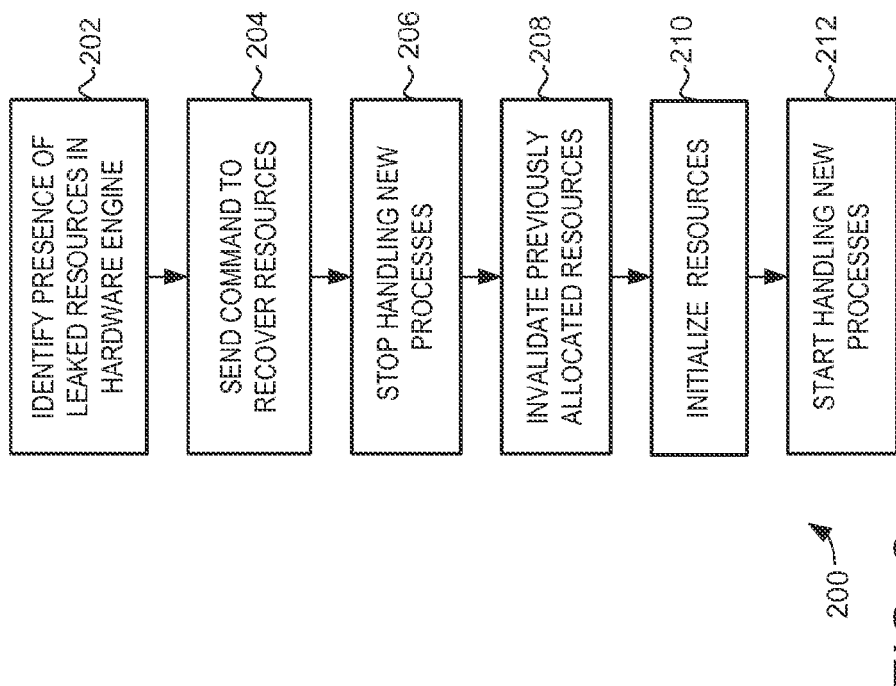
FIG. 2 is a flow diagram in accordance with an exemplary embodiment.

Turning now to FIG. 2, an exemplary method 200 for freeing leaked resources is illustrated. A first step 202 is to identify the presence of a leaked resource in a hardware engine. As described above, in one embodiment this can be performed by monitoring for a frame counter that does not change even while the port is known to be busy. When such a stuck frame counter is identified, the presence of a leaked resource can be assumed.

The next step 204 is to send a command to recover the resources in response to the identified leaked resources. Such a command can set an appropriate memory mapped register. The next step 206 is to stop handling new processes in the plurality of hardware engines. This can be accomplished by sending appropriate commands to the plurality of hardware engines in response to the setting of the memory mapped register.

The next step 208 is to invalidate the previously allocated resources. Such an action can be performed by issuing appropriate commands to the plurality of hardware engines to recognize that all data associated with those resources has been cleared. Such commands could be issued directly from resource manager, or through some other intermediary.

The next step 210 is to initialize the previously allocated resources. Such an action can be performed by clearing the appropriate buffer available vector. Clearing the buffer available vector makes the associated memory chunks available for reallocation.

The next step 212 is to start handling new processes. Such an action can be performed by issuing appropriate commends to the plurality of hardware engines. Such commands could be issued directly from resource manager 102, or through some other intermediary.

The embodiments described herein thus provide devices and methods for recovering resources in processing devices. These techniques allow the resources for specific hardware engines to be recovered without requiring a reboot of the entire system. The system and method can thus recover those resources more quickly and efficiently. When such resources are effectively recovered those hardware engines can quickly resume operations.

In one embodiment a method of recovering resources in a hardware processing core that includes one or more hardware engines is provided. The method comprises: stopping processes running in a hardware engine, the hardware engine corresponding to a leaked resource; invalidating resources previously allocated to the hardware engine; initializing the resources; and starting handling of new processes in the hardware engine corresponding to the leaked resource.

In another embodiment a processing unit is provided, comprising: a hardware processing core; a plurality of hardware engines in the hardware processing core; a resource manager, wherein the resource manager is configured to manage resources for the plurality of hardware engines, the resource manager comprises a memory mapped register accessible to software, wherein the memory mapped register is configured to receive a command to recover a leaked resource, and, in response to a received command to recover the leaked resource, the resource manager is further configured to: stop processes in the plurality of hardware engines, invalidate resources previously allocated to the hardware engines, initialize the resources, and start handling of new processes in the hardware engines.

In another embodiment, processing unit is provided, comprising: a plurality of hardware processing cores, each of the plurality of hardware processing cores including: a memory; a plurality of hardware engines; a plurality of resource managers, each of the plurality of resource managers including a memory mapped register accessible to software, with each memory mapped register configured to receive a command to recover a leaked resource, and wherein, in response to a received command to recover the leaked resource, the resource manager is configured to: stop processes in the plurality of hardware engines; invalidate resources previously allocated to the plurality of hardware engines; initialize the resources; and start handling of new processes in the plurality of hardware engines; and a monitoring module, the monitoring module configured to identify an occurrence of a leaked resource in the hardware processing core by monitoring for a stuck frame in the plurality of hardware processing cores, the monitoring module configured to issue the command to recover the leaked resource to a corresponding one of the plurality of resource managers in response a detecting the stuck frame in the plurality of hardware processing cores.

For the sake of brevity, conventional techniques related to processor design may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter. It should be understood that devices described herein may be implemented either in silicon or another semiconductor material or alternatively by software code representation thereof.

The foregoing description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Unless expressly stated otherwise, "coupled" means that one element is directly or indirectly joined to (or directly or indirectly communicates with) another element, and not necessarily mechanically. Thus, although the schematics shown in the figures depict exemplary arrangements of elements, additional intervening elements, devices, features, or components may be present in an embodiment of the depicted subject matter. In addition, certain terminology may also be used in the foregoing description for the purpose of reference only, and thus are not intended to be limiting.

The terms "first," "second," "third," "fourth" and the like in the description and the claims are used for distinguishing between elements and not necessarily for describing a particular structural, sequential or chronological order. It is to be understood that the terms so used are interchangeable under appropriate circumstances. Furthermore, the terms "comprise," "include," "have" and any variations thereof, are intended to cover non-exclusive inclusions, such that a circuit, process, method, article, or apparatus that comprises a list of elements is not necessarily limited to those elements, but may include other elements not expressly listed or inherent to such circuit, process, method, article, or apparatus.

The foregoing description of specific embodiments reveals the general nature of the inventive subject matter sufficiently that others can, by applying current knowledge, readily modify and/or adapt it for various applications without departing from the general concept. Therefore, such adaptations and modifications are within the meaning and range of equivalents of the disclosed embodiments. The inventive subject matter embraces all such alternatives, modifications, equivalents, and variations as fall within the spirit and broad scope of the appended claims.

What is claimed is:

1. A processing unit, comprising:
a hardware processing core;
a plurality of hardware engines in the hardware processing core;
a memory in the hardware processing core;
a resource manager in the hardware processing core, wherein
the resource manager is configured to manage allocation of resources in the memory for the plurality of hardware engines,
the resource manager comprises a memory mapped register accessible to software, wherein the memory mapped register is configured to receive a command to recover a leaked resource in the memory, and, in response to a received command to recover the leaked resource in the memory, the resource manager is further configured to:
stop processes in the plurality of hardware engines,
invalidate resources in the memory previously allocated to the hardware engines,
initialize the resources in the memory, and
start handling of new processes in the hardware engines.

2. The processing unit of claim 1, wherein the processing unit is further configured to identify an occurrence of the leaked resource in the memory in the hardware processing core by being configured to monitor for a stuck frame in the hardware processing core.

3. The processing unit of claim 2, wherein the processing unit is configured to monitor for a stuck frame in the hardware processing core by being configured to monitor for a frame counter that doesn't change for a set period of time while an associated port is active.

4. The processing unit of claim 3, wherein the processing unit is configured to set the memory mapped register in the resource manager in response to the frame counter not changing for the set period of time while the associated port is active.

5. The processing unit of claim 1, wherein the resource manager is configured to invalidate the resources in the memory previously allocated to the hardware engine by being configured to send a command to the hardware engine instructing the hardware engine to invalidate the resources in the memory.

6. The processing unit of claim 1, wherein the resource manager is configured to initialize the resources in the memory by being configured to clear a buffer available vector.

7. A processing unit, comprising:
a plurality of hardware processing cores, each of the plurality of hardware processing cores including:
a memory;
a plurality of hardware engines;
a plurality of resource managers, each of the plurality of resource managers configured to allocate resources in the memory, each of the plurality of resource managers including a memory mapped register accessible to software, with each memory mapped register configured to receive a command to recover a leaked resource in the memory, and wherein, in response to a received command to recover the leaked resource in the memory, the resource manager is configured to:
stop processes in the plurality of hardware engines;
invalidate resources in the memory previously allocated to the plurality of hardware engines;

initialize the resources in the memory; and start handling of new processes in the plurality of hardware engines; and a monitoring module, the monitoring module configured to identify an occurrence of a leaked resource in the memory in the hardware processing core by monitoring for a stuck frame in the plurality of hardware processing cores, the monitoring module configured to issue the command to recover the leaked resource in the memory to a corresponding one of the plurality of resource managers in response a detecting the stuck frame in the plurality of hardware processing cores.

8. The processing unit of claim 7, wherein the monitoring module is configured to monitoring for a stuck frame in the hardware processing core by being configured to monitor for a frame counter that doesn't change for a set period of time while an associated port is active.

9. The processing unit of claim 8, wherein the monitoring module is configured to set the memory mapped register in the resource manager in response to the frame counter not changing for the set period of time while the associated port is active.

10. The processing unit of claim 7, wherein the corresponding one of the plurality of resource managers is configured to invalidate the resources in the memory previously allocated to a corresponding plurality of hardware engines by being configured to send a command to the corresponding plurality of hardware engines instructing the corresponding plurality of hardware engines to invalidate the resources in the memory.

11. The processing unit of claim 7, wherein the one of the plurality of resource managers is configured to initialize the resources in the memory by being configured to clear a buffer available vector on the corresponding one of the plurality of resource managers.

* * * * *